(12) United States Patent　　(10) Patent No.: US 9,327,226 B2
McAlister　　(45) Date of Patent: May 3, 2016

(54) DYNAMIC FILTRATION SYSTEM AND ASSOCIATED METHODS

(71) Applicant: McAlister Technologies, LLC, Phoenix, AZ (US)

(72) Inventor: Roy Edward McAlister, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 0 days.

(21) Appl. No.: 14/145,663

(22) Filed: Dec. 31, 2013

(65) Prior Publication Data

US 2014/0356245 A1　　Dec. 4, 2014

Related U.S. Application Data

(63) Continuation of application No. 13/584,705, filed on Aug. 13, 2012, now Pat. No. 8,617,399.

(60) Provisional application No. 61/523,228, filed on Aug. 12, 2011.

(51) Int. Cl.
*B01D 46/00*　　(2006.01)
*B01D 35/06*　　(2006.01)
(Continued)

(52) U.S. Cl.
CPC ............ *B01D 46/0034* (2013.01); *B01D 35/06* (2013.01); *B01D 46/42* (2013.01); *B01J 19/12* (2013.01); *B03C 1/02* (2013.01); *B03C 1/032* (2013.01); *B03C 1/0332* (2013.01);
(Continued)

(58) Field of Classification Search
CPC .... B01D 46/00; B01D 35/06; B01D 46/0034; B01J 19/12; B03C 1/02; B03C 1/30; B03C 2201/18
See application file for complete search history.

(56) References Cited

U.S. PATENT DOCUMENTS 3,404,061 A　　10/1968　Shade et al.
3,830,204 A　　8/1974　McAlister
(Continued)

FOREIGN PATENT DOCUMENTS

EP　　0025858 A1　　4/1981
EP　　0056717 A2　　7/1982
(Continued)

OTHER PUBLICATIONS

Dash, J.C., "Two-Dimensional Matter," Scientific American, May 1973, pp. 30-40.
(Continued)

*Primary Examiner* — David A Reifsnyder
(74) *Attorney, Agent, or Firm* — Perkins Coie LLP

(57) ABSTRACT

Dynamic filtration systems and associated methods are disclosed herein. In one embodiment, for example, a filtration system can include a filter device having a body portion positioned between first and second end portions and a filter media in a cavity defined by the body portion. The filter media can be configured to filter a predetermined substance from a ferrofluid. The filter device can further include a coil at the body portion, a first magnetic plate proximate the first end portion and a second magnetic plate proximate the second end portion. The coil can generate a first magnetic field across the body portion, and the first and second magnetic plates interact to form a second magnetic field across the body portion. The first and second magnetic fields can be configured to drive filtration of the ferrofluid.

21 Claims, 11 Drawing Sheets

(51) Int. Cl.
  *B01J 19/12*   (2006.01)
  *B03C 1/02*    (2006.01)
  *B03C 1/30*    (2006.01)
  *B03C 1/032*   (2006.01)
  *B03C 1/033*   (2006.01)
  *B03C 1/28*    (2006.01)
  *B01D 46/42*   (2006.01)

(52) U.S. Cl.
  CPC .............. *B03C 1/286* (2013.01); *B03C 1/30* (2013.01); *B01J 2219/12* (2013.01); *B03C 2201/18* (2013.01)

(56) References Cited

U.S. PATENT DOCUMENTS

| | | |
|---|---|---|
| 3,935,354 A | 1/1976 | Olcott |
| 3,967,256 A | 6/1976 | Galatis |
| 4,066,046 A | 1/1978 | McAlister |
| 4,077,788 A | 3/1978 | Woollam |
| 4,094,762 A | 6/1978 | Clelland |
| 4,193,827 A | 3/1980 | Woollam |
| 4,210,103 A | 7/1980 | Dimitroff et al. |
| 4,407,238 A | 10/1983 | Yoon |
| 4,472,275 A | 9/1984 | Yano |
| 4,495,074 A | 1/1985 | Hagiwara et al. |
| 4,567,857 A | 2/1986 | Houseman et al. |
| 4,588,106 A | 5/1986 | Stark, Sr. et al. |
| 4,600,529 A | 7/1986 | Hallen et al. |
| 4,676,972 A | 6/1987 | Velenyi et al. |
| 5,067,447 A | 11/1991 | Iwaki et al. |
| 5,220,080 A | 6/1993 | Lyons et al. |
| 5,284,996 A | 2/1994 | Vickers |
| 5,343,699 A | 9/1994 | McAlister |
| 5,618,501 A | 4/1997 | Wieres et al. |
| 5,639,707 A | 6/1997 | Lewis et al. |
| 5,648,184 A | 7/1997 | Inoue et al. |
| 5,772,938 A | 6/1998 | Sharp |
| 5,822,838 A | 10/1998 | Seal et al. |
| 6,015,041 A | 1/2000 | Heung |
| 6,015,065 A | 1/2000 | McAlister |
| 6,155,212 A | 12/2000 | McAlister |
| 6,432,176 B1 | 8/2002 | Klos et al. |
| 6,466,597 B1 | 10/2002 | Kume et al. |
| 6,503,584 B1 | 1/2003 | McAlister |
| 6,540,816 B2 | 4/2003 | Allie et al. |
| 6,626,981 B2 | 9/2003 | Wojtowicz et al. |
| 6,660,063 B2 | 12/2003 | Tom et al. |
| 6,709,497 B2 | 3/2004 | Myasnikov et al. |
| 6,743,278 B1 | 6/2004 | Carruthers |
| 6,756,140 B1 | 6/2004 | McAlister |
| 6,834,508 B2 | 12/2004 | Bradley et al. |
| 6,860,923 B2 | 3/2005 | Myasnikov et al. |
| 6,918,382 B2 | 7/2005 | Ramachandran et al. |
| 6,918,430 B2 | 7/2005 | Myasnikov et al. |
| 6,939,394 B2 | 9/2005 | Carruthers |
| 7,011,768 B2 | 3/2006 | Jensen et al. |
| 7,048,839 B2 | 5/2006 | Harada |
| 7,097,748 B2 | 8/2006 | Duffy et al. |
| 7,112,239 B2 | 9/2006 | Kimbara et al. |
| 7,169,214 B2 | 1/2007 | Kubo et al. |
| 7,169,489 B2 | 1/2007 | Redmond |
| 7,172,645 B1 | 2/2007 | Pfister et al. |
| 7,175,826 B2 | 2/2007 | Lemmon et al. |
| 7,241,331 B2 | 7/2007 | Wu et al. |
| 7,306,862 B2 | 12/2007 | Kramer et al. |
| 7,320,726 B2 | 1/2008 | Shih et al. |
| 7,323,043 B2 | 1/2008 | Finamore |
| 7,325,401 B1 | 2/2008 | Kesseli et al. |
| 7,331,178 B2 | 2/2008 | Goldman |
| 7,363,965 B2 | 4/2008 | Myasnikov et al. |
| 7,399,325 B1 | 7/2008 | Redmond |
| 7,418,782 B2 | 9/2008 | Kimbara et al. |
| 7,431,756 B2 | 10/2008 | Myasnikov et al. |
| 7,455,719 B2 | 11/2008 | Carruthers |
| 7,455,723 B2 | 11/2008 | Voss et al. |
| 7,494,530 B2 | 2/2009 | Carruthers |
| 7,594,939 B2 | 9/2009 | Goldstein et al. |
| 7,712,605 B2 | 5/2010 | Suzuki et al. |
| 7,727,492 B2 | 6/2010 | Myasnikov et al. |
| 7,771,512 B2 | 8/2010 | Norton et al. |
| 7,780,747 B2 | 8/2010 | Carruthers et al. |
| 7,911,071 B2 | 3/2011 | Devine |
| 8,002,880 B2 | 8/2011 | Carruthers |
| 8,015,808 B2 | 9/2011 | Keefer et al. |
| 8,066,946 B2 | 11/2011 | Redmond |
| 8,147,599 B2 | 4/2012 | McAlister |
| 8,441,361 B2 | 5/2013 | McAlister |
| 8,617,399 B2* | 12/2013 | McAlister ............. 210/223 |
| 8,828,491 B2 | 9/2014 | McAlister |
| 8,980,416 B2 | 3/2015 | McAlister |
| 2002/0112479 A1 | 8/2002 | Keefer et al. |
| 2003/0167923 A1 | 9/2003 | Grote et al. |
| 2003/0209149 A1 | 11/2003 | Myasnikov et al. |
| 2004/0076561 A1 | 4/2004 | Kajiura et al. |
| 2006/0048808 A1 | 3/2006 | Ruckman et al. |
| 2006/0088739 A1 | 4/2006 | Ovshinsky |
| 2008/0203101 A1 | 8/2008 | Kimbara et al. |
| 2008/0226532 A1 | 9/2008 | Zak-Fang et al. |
| 2009/0014062 A1 | 1/2009 | Kayama et al. |
| 2009/0229555 A1 | 9/2009 | Ginzburg et al. |
| 2011/0041519 A1 | 2/2011 | McAlister |
| 2011/0206915 A1 | 8/2011 | McAlister |
| 2013/0064979 A1 | 3/2013 | McAlister |
| 2013/0101808 A1 | 4/2013 | McAlister |
| 2013/0206698 A1 | 8/2013 | McAlister |

FOREIGN PATENT DOCUMENTS

| | | |
|---|---|---|
| EP | 1256369 A2 | 11/2002 |
| JP | 06-182125 A | 7/1994 |
| JP | 08-206420 A | 8/1996 |
| JP | 2001-254897 A | 9/2001 |
| JP | 2001295995 A | 10/2001 |
| JP | 2002128501 A | 5/2002 |
| JP | 2004-268022 A | 9/2004 |
| JP | 2005199163 A | 7/2005 |
| JP | 2006035174 A | 2/2006 |
| JP | 2007077265 A | 3/2007 |
| WO | WO-96/41745 A1 | 12/1996 |
| WO | WO-02/056400 A2 | 7/2002 |
| WO | WO-03/078252 A2 | 9/2003 |
| WO | WO-2004/016982 A2 | 2/2004 |
| WO | WO-2004/024845 A2 | 3/2004 |
| WO | WO-2004/050798 A2 | 6/2004 |
| WO | WO-2004/053383 A2 | 6/2004 |
| WO | WO-2004/108590 A2 | 12/2004 |

OTHER PUBLICATIONS

Donnet et al., "Carbon Black: Physics, Chemistry, and Elastomer Reinforcement," New York: M. Dekker, 1976, pp. 16-18.

Japanese Office Action for Application No. 2012-526835; Applicant: McAlister Technologies, LLC, Date of Mailing: Aug. 21, 2012, 4 pages.

Steinberg, M., "The Hy-C Process (thermal Decomposition of Natural Gas) Potentially the Lowest Cost Source of Hydrogen with the Least $CO_2$ Emission," Energy Conversion and Management, vol. 36, No. 6-9, 1995, pp. 791-796.

Sun et al., "High-pressure Laminar Flame Speeds and Kinetic Modeling of Carbon Monoxide/hydrogen Combustion," Proceedings of the Combustion Institute, vol. 31, Issue 1, Jan. 2007, pp. 439-446.

International Search Report and Written Opinion for Application No. PCT/US2012/050650; Applicant: McAlister Technologies, LLC.; Date of Mailing: Feb. 25, 2013, 9 pages.

* cited by examiner

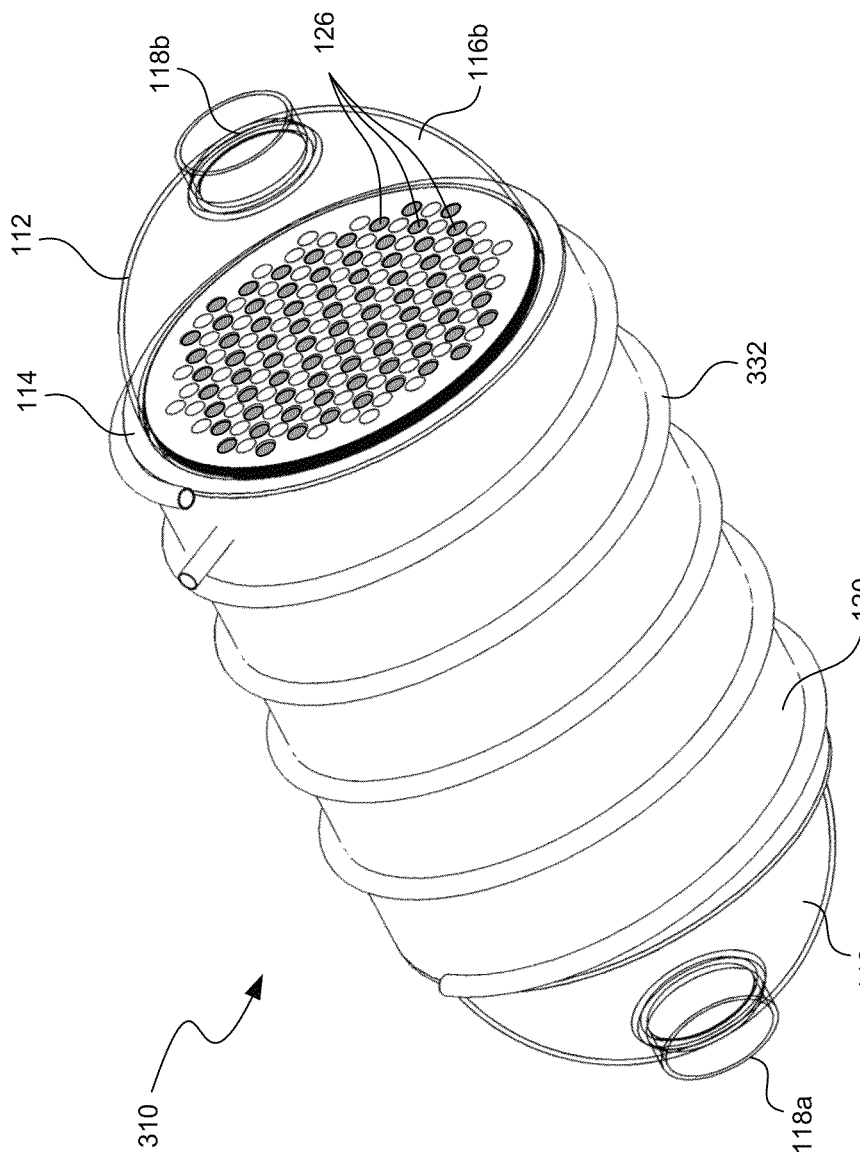

DYNAMIC FILTRATION SYSTEM AND ASSOCIATED METHODS

CROSS-REFERENCE TO RELATED APPLICATION(S)

The present application is a continuation of U.S. patent application Ser. No. 13/584,705 filed Aug. 13, 2013, now U.S. Pat. No. 8,617,399 issued Dec. 31, 2013, which application claims the benefit of and priority to U.S. Provisional Application No. 61/523,228, filed Aug. 12, 2011, entitled, "DYNAMIC FILTRATION SYSTEM AND ASSOCIATED METHODS," which is incorporated herein by reference in its entirety.

TECHNICAL FIELD

The present technology relates generally to filtration systems and, more particularly, to dynamic filtration systems and associated methods.

BACKGROUND

Filtration systems can be used to intercept and remove particles or substances from a fluid. Many such filtration systems are typically configured to remove a specific contaminant (e.g., sulfur) or configured for use with a certain type of fluid (e.g., liquid versus gas, oil versus water). Accordingly, there is a need to provide filtration systems that can be adapted to filter a variety of different fluids and remove a variety of different contaminants.

BRIEF DESCRIPTION OF THE DRAWINGS

FIGS. 3A and 3B are partially transparent isometric views of a filter device configured in accordance with another embodiment of the present technology.

DETAILED DESCRIPTION

The present disclosure is directed toward dynamic filtration systems and associated methods. Several embodiments described below are directed toward dynamic filtration systems including, for example, a filter device that utilizes a permanent magnetic field and an induced magnetic field to drive filtration of ferrofluids and separate contaminants or other substances from ferrofluids. The magnetic fields and the filter media can both be adjusted to filter a wide variety of substances, making the dynamic filtration system adaptable to various waste streams. As used herein, the term "ferrofluid" refers to fluids that become magnetized in the presence of a magnetic field. The term "fluid" is to be interpreted broadly throughout the specification and can include, for example, liquids, gases, plasmas, and/or solutions, some of which may include solid particles dispersed throughout the fluid. Additionally, several embodiments described herein refer to filtering contaminants from a fluid. The term "contaminant" refers to any substance being removed from a fluid by the filter media.

Certain details are set forth in the following description and in FIGS. 1A-7 to provide a thorough understanding of various embodiments of the disclosure. However, other details describing well-known structures and systems often associated with filters, filter media, and/or other aspects of filtration systems are not set forth below to avoid unnecessarily obscuring the description of various embodiments of the disclosure. Thus, it will be appreciated that several of the details set forth below are provided to describe the following embodiments in a manner sufficient to enable a person skilled in the relevant art to make and use the disclosed embodiments. Several of the details and advantages described below, however, may not be necessary to practice certain embodiments of the disclosure.

Reference throughout this specification to "one embodiment" or "an embodiment" means that a particular feature, structure, or characteristic described in connection with the embodiment is included in at least one embodiment of the present disclosure. Thus, the occurrences of the phrases "in one embodiment" or "in an embodiment" in various places throughout this specification are not necessarily all referring to the same embodiment. Furthermore, the particular features, structures, or characteristics described with reference to a particular embodiment may be combined in any suitable manner in one or more other embodiments. Moreover, the headings provided herein are for convenience only and do not interpret the scope or meaning of the claimed disclosure.

Figure 1A:
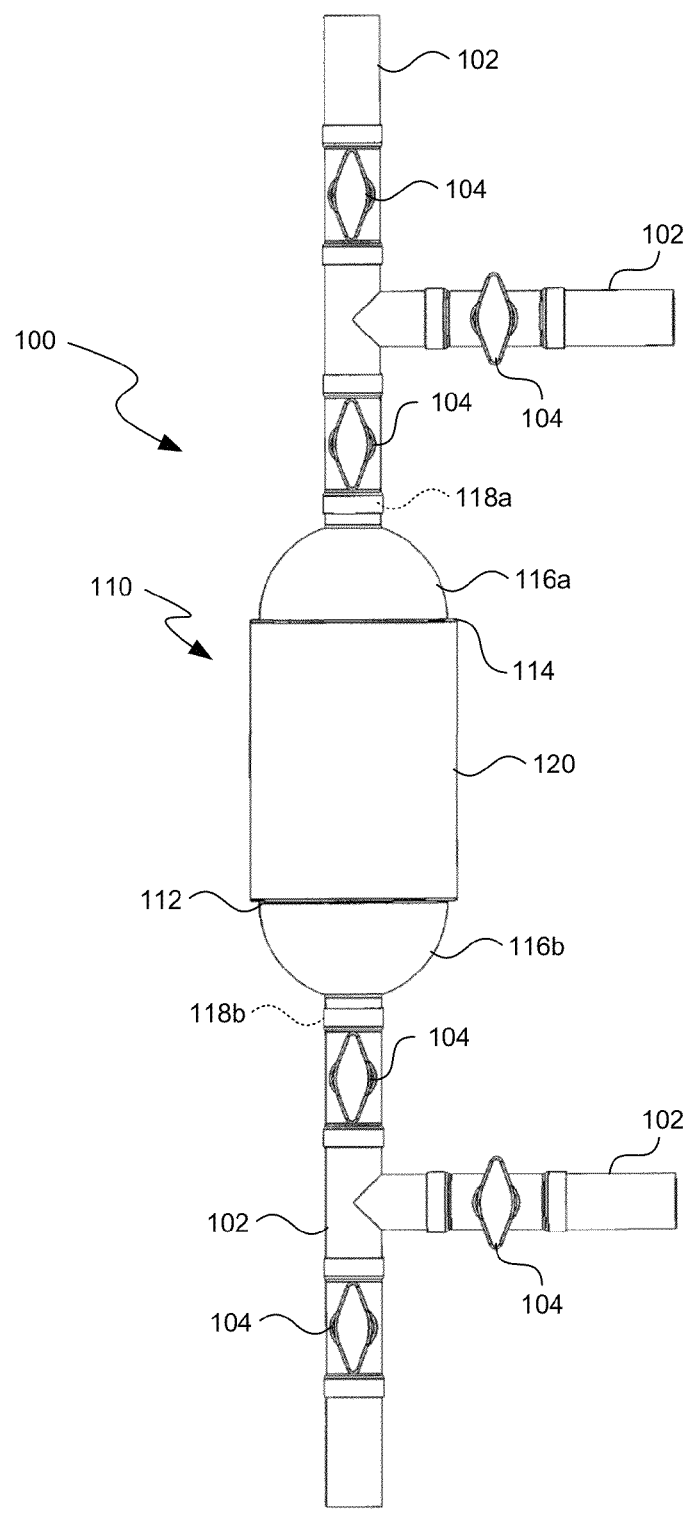
FIG. 1A is a perspective front view of a dynamic filtration system configured in accordance with an embodiment of the present technology.
Figure 1B:
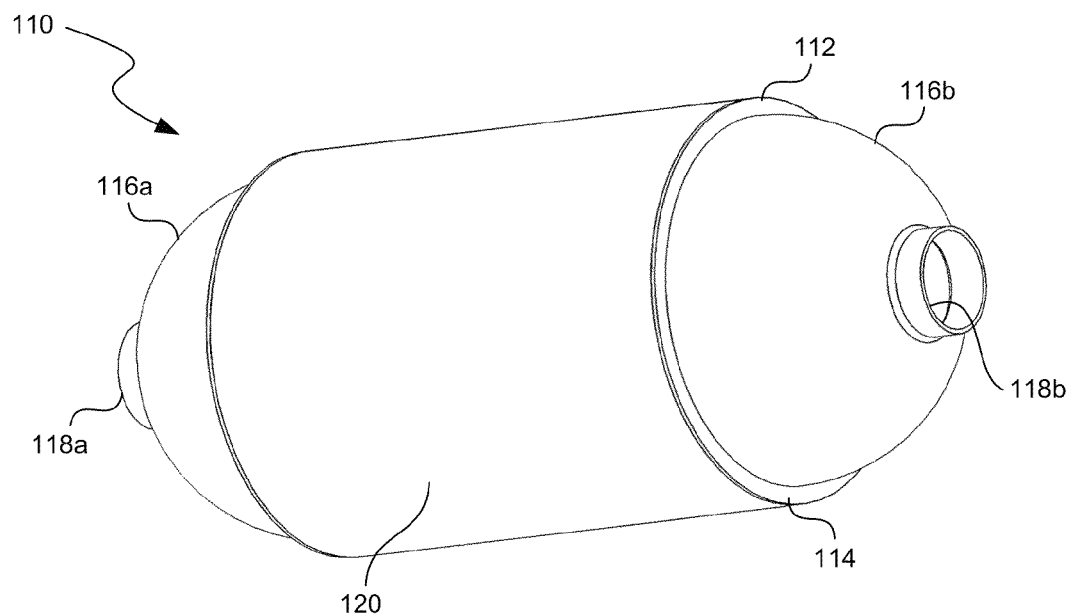
FIG. 1B is an isometric view of a filter device configured in accordance with an embodiment of the present technology.
Figure 1C:
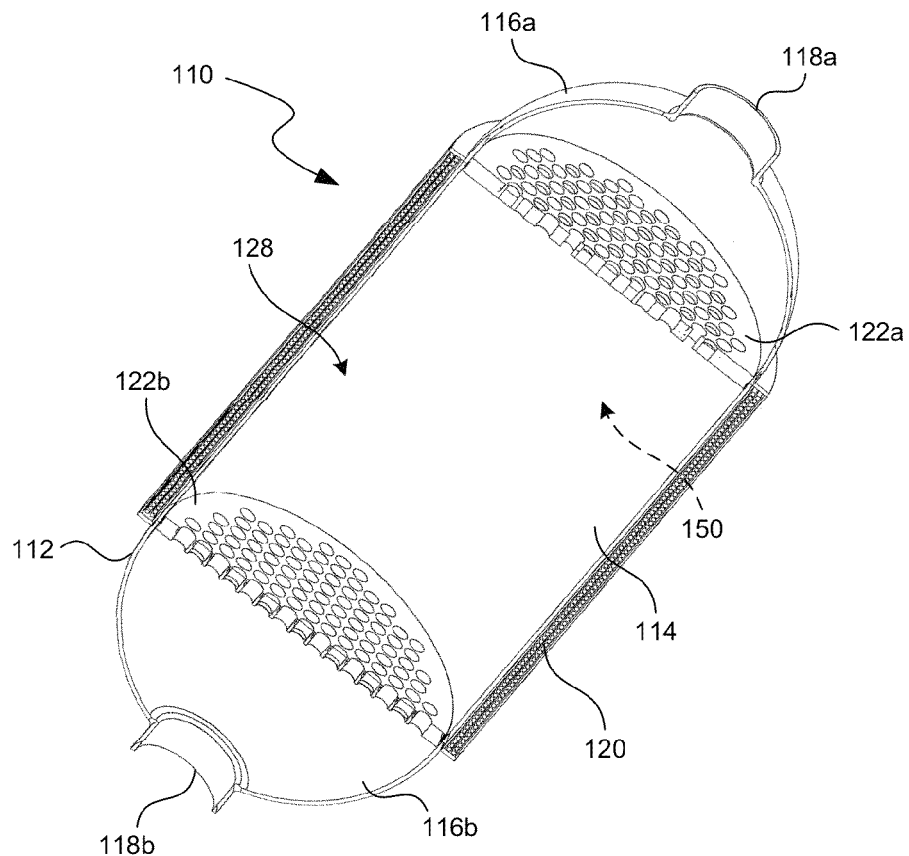
FIG. 1C is an isometric cut-away view of the filter device of FIG. 1B.

FIG. 1A is a perspective front view of a dynamic filtration system 100 ("system 100") including a filter device 110 configured in accordance with an embodiment of the present technology, and FIGS. 1B and 1C are isometric and isometric cut-away views, respectively, of the filter device 110 of FIG. 1A. Referring first to FIG. 1A, the system 100 can include one or more passageways 102 (e.g., tubing, piping, etc.) that feed an unfiltered fluid to the filter device 110 and transfer a filtered fluid away from the filter device 110. The passageways 102 can be made from materials that are suitable for transporting fluids, such as plastics (e.g., PE, PP, PTFE, PFA, CPVC, PVC), metals (e.g., copper), and/or other suitable plumbing materials. Valves 104 can be positioned on or in the passageways 102 to regulate fluid flow to, from, and through the filter device 110 and direct fluid toward and away from the filter device 110. The valves 104 can be any of a number of conventional fluid regulation valves, such as ball valves, gate valves, check valves, pinch valves, etc.

Referring to FIGS. 1A-1C together, the filter device 110 can include a canister, cartridge, or housing 112 having a body portion 114 positioned between opposing end portions (identified individually as a first end portion 116a and a second end portion 116b, and referred to collectively as end portions 116). The end portions 116 can include openings (identified individually as a first opening 118a and a second opening 118b, and referred to collectively as openings 118) that allow fluid to enter and exit the filter device 110 (e.g., from the passageways 102 shown in FIG. 1A). In one embodiment, the first opening 118a can be configured as an inlet through which an unfiltered fluid enters the filter device 110, and the second opening 118b can be configured as an outlet through which the filtered fluid exits the filter device 110. In other embodiments, the inlet and the outlet can be reversed. In various embodiments, the openings 118 can also be configured to serve as both the inlet and the outlet depending upon the direction of fluid flow through the system 100.

The housing 112 can be made from a polymer material, a transmissive material (e.g., glass), and/or other suitable filtration housing materials. In various embodiments, the housing 112 can be a single integrated structure or unit. For example, the housing 112 can be made by compression molding polymer particles (e.g., polyfin particles made from recycled fluid containers) to form the the housing 112. In other embodiments, the housing 112 can be made by injection molding, extrusion, pultrusion, injection blow molding, thermoforming, or otherwise forming two or more pieces of the housing 112, and subsequently joining the pieces together by gluing, welding, and/or using suitable fastening methods known in the art.

Referring to FIG. 1C, the filter device 110 can further include an insulated conductor coil 120 (e.g., a solenoid) positioned proximate (e.g., in or around) an outer surface of the housing 112. In the illustrated embodiment, the coil 120 extends along the length of the body portion 114. However, in other embodiments the coil 120 can be positioned along shorter or longer portions of the body portion 114 and/or on other portions of the filter device 110. The coil 120 can be formed around a metallic core (e.g., an iron alloy core) and configured to carry an electric current such that the coil 120 forms an electromagnetic field across at least a portion of the filter device 110.

Figure 1D:
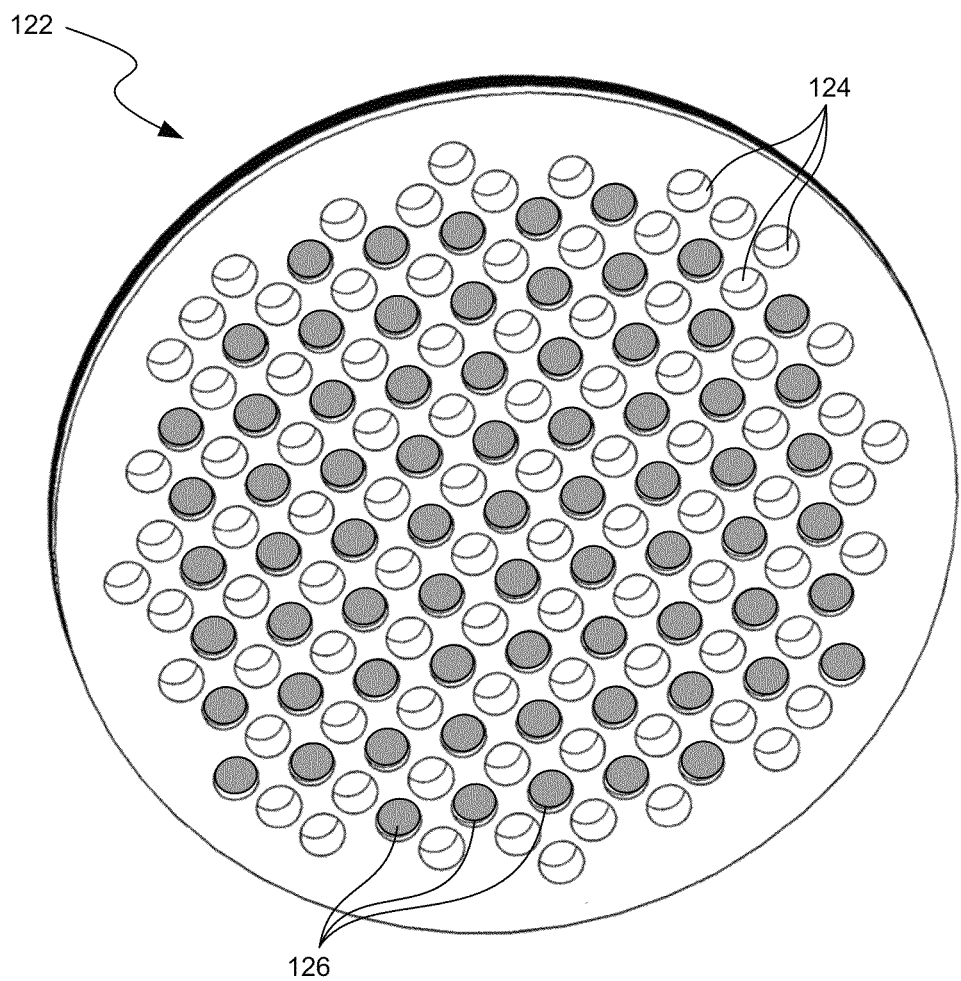
FIG. 1D is an enlarged view of a magnetic plate used in the filter device of FIGS. 1B and 1C and configured in accordance with an embodiment of the present technology.

As further shown in FIG. 1C, the filter device 110 can also include magnetic plates (identified individually as a first magnetic plate 122a and a second magnetic plate 122b, and referred to collectively as magnetic plates 122) positioned proximate the opposing end portions 116 of the housing 112. FIG. 1D is an enlarged isometric view of one of the magnetic plates 122. In the illustrated embodiment, the magnetic plate 122 includes a matrix of openings, apertures, or holes 124 across the face of the magnetic plate 122 and a plurality of magnets 126 positioned in selected holes 124. The magnetic plate 122 itself can also be made from magnetic materials with properties such as ferromagnetism, antiferromagnetism, paramagnetism, or diamagnetism, in response to a magnetic field, and/or may be made from nonmagnetic materials (e.g., ceramics, glass or plastics) that can support the magnets 126. The magnets 126 of the first magnetic plate 122a can interact with the magnets 126 of the second magnetic plate 122b to form various magnetic fields such as along the length of the body portion 116. The positions and pole orientations of the magnets 126 in the holes 124 can be selected to alter the force and/or direction of the magnetic field between the magnetic plates 122.

The magnets 126 and/or proximate materials can be made from ferromagnetic materials, paramagnetic materials, and/or other magnetic materials. Some ferromagnetic materials, known to those in the art as "hard iron" materials, retain magnetization in the absence of an applied magnetic field, whereas paramagnetic materials, known as "soft iron" materials, are only magnetic in the presence of an externally applied magnetic field. For example, the magnetic field produced by the coil 120 can also magnetize any paramagnetic magnetic materials positioned on or in the fields of magnetic plates 122. In various embodiments, the ratio of ferromagnetic to paramagnetic materials can be manipulated to alter the strength and/or location of the magnetic field produced by the magnetic plates 122. The magnetic field produced by the magnetic plates 122 can also be changed by manipulating the positions and orientations of the magnets 126. For example, changing the orientation of the magnets 126 (e.g., rotating the magnets 126) can reorient or reverse the direction of the magnetic field.

In operation, a ferrofluid can be introduced into the filter device 110 via one of the openings 118. The magnetic field induced by the coil 120 and concentrated or generated by the magnetic plates 122 can interact with the ferrofluid (e.g., such that the ferrofluid assumes a structure under the magnetic field) to drive it through the filter device 110. In instances where the fluid being filtered is not inherently a ferrofluid (e.g., water, alcohol, glycerin, etc.), the fluid can be pre-treated and loaded with ferromagnetic or iron particles such that it takes on the properties of a ferrofluid and can be used with the filter device 110. In various aspects of the technology, the magnetic fields provided by the coil 120 and/or the magnetic plates 122 can be manipulated (e.g., by changing the current magnitude or direction, frequency of application, and/or orientation of the magnets 126 in the magnetic plates 122) to alter the flow rate of the ferrofluid through the filter device 110. The magnetic fields can therefore provide flow impetus or valving ("magnetic valving") for system 100. The magnetic fields can also be manipulated to change properties or characteristics (e.g., viscosity) of the ferrofluid being filtered, and therefore can change the substances filtered from the ferrofluid. Accordingly, the magnetic fields created by the filter device 110 can be used both to treat the fluid and drive filtration (i.e., load and unload the filter device 110 with the ferrofluid).

In various aspects of the present technology, the filter device 110 can be manipulated to control the size of the precipitate (i.e., the filtered substance). For example, the dwell time of the fluid can be changed by manipulating the magnetic plates 122 to slow the flow rate of the fluid through the filter device 110. Additionally, the temperature, pressure, and/or other characteristics of the filter device 110 can be modified to create a certain collection or precipitate size. In selected embodiments, for example, carbonyls can be used generate iron of a specific particle size and shape.

Referring back to FIG. 1C, the filter device 110 can have a cavity 128 that includes and/or is loaded with a filter media 150 through which the ferrofluid is filtered. The filter media 150 can be introduced into the cavity 128 before filtration and/or during filtration (e.g., in conjunction with the ferrofluid). For example, the cavity 128 can be pre-loaded with graphene, activated carbon, boron, spinel, zeolite, and/or other suitable filtration substances. In various embodiments, the cavity 128 can be loaded with an architectural construct. Architectural constructs are synthetic matrix characterizations of crystals that are primarily comprised of graphene, graphite, boron nitride, and/or another suitable crystal or constituent. The configuration and the treatment of these crystals heavily influences the properties that the architectural construct will exhibit when it experiences certain conditions. For example, architectural constructs can be manipulated to obtain the requisite geometry, orientation, and surface tension to load (e.g., adsorb) almost any element or soluble substance. Accordingly, the architectural construct can be configured to load a predetermined substance (e.g., sulfur or a compound containing sulfur such as iron or hydrogen sulfide) introduced into the cavity 128 in a non-fixed state, and selectively filter and/or chemically bind (e.g. form a compound or otherwise reside on or within the surface of ferromagnetic particles) to isolate the predetermined substance and remove it from the fluid. In other embodiments, the architectural construct can be introduced into the system as the fluid enters the filter device 110. Additional features and characteristics of architectural constructs are described in U.S. patent application Ser. No. 13/027,214, filed Feb. 14, 2011, now U.S. Pat. No. 8,980,416, and entitled "ARCHITECTURAL CONSTRUCT HAVING FOR EXAMPLE A PLURALITY OF ARCHITECTURAL CRYSTALS"; U.S. patent application Ser. No. 13/584,652, filed Aug. 13, 2012, and entitled "ARCHITECTURAL CONSTRUCT HAVING A PLURALITY OF IMPLEMENTATIONS"; and U.S. patent application Ser. No. 13/584,644 filed Aug. 13, 2012, and entitled "ARCHITECTURAL CONSTRUCT HAVING FOR EXAMPLE A PLURALITY OF ARCHITECTURAL CRYSTALS", each of which is incorporated herein by reference in its entirety.

In other embodiments, an architectural construct can be configured as a substrate made from a sorption media that comprises parallel layers of a sorption material spaced apart from one another by a certain distance or varying distances. A substance can be presented at an edge of the substrate where the sorption media provides access to zones between layers of the sorption material. Heat may be transferred away from the sorption media to facilitate and/or cause the sorption media to load (i.e. absorb and/or adsorb) molecules of the substance into the sorption media. In other embodiments, a voltage of a first polarity may be applied to the sorption media to facilitate and/or cause the sorption media to load molecules of the substance. In further embodiments, a pressure experienced by the sorption media may be increased to facilitate and/or cause the sorption media to load molecules of the substance. The sorption media can also include surface structures that load the substance and/or catalysts that facilitate the loading of a substance into the sorption media. A substance can be unloaded from the sorption media by transferring heat to the sorption media, applying a voltage of an opposite polarity than the first polarity to the sorption media, and/or by reducing a pressure experienced by the sorption media. Additional features and ways of manipulating architectural constructs with sorption substrates are described in U.S. patent application Ser. No. 12/857,515, filed Aug. 16, 2010, now U.S. Pat. No. 8,147,599, and entitled "APPARATUSES AND METHODS FOR STORING AND/OR FILTERING A SUBSTANCE", which is incorporated herein by reference in its entirety In certain embodiments, the filter device 110 can use the filter media 150 (e.g., an architectural construct) to filter sulfur from a fluid (e.g., natural gas). The architectural construct can first be loaded with iron, iron carbide, various compounds of halogens and iron, and/or other substances or elements that have an affinity to sulfur, and then introduced into the filter device 110 (before or during filtration). When the sulfur-laden fluid flows through the loaded architectural construct, the sulfur separates from the fluid to join with the iron to form iron sulfide.

The architectural constructs and/or other filter media 150 in the cavity 128 can be configured to selectively remove substances from the ferrofluid as it passes through the filter device 110. For example, an architectural construct can be configured to remove sulfur from natural gas or renewable fuels. The magnetic fields generated by the magnetic plates 122 and the coil 120 can drive the ferrofluid through the cavity 128 and, in various embodiments, change the characteristics of the ferrofluid such that certain substances are allowed to pass through the cavity while others are trapped by the filter media 150. Accordingly, the filter device 110 allows for numerous variables (e.g., strength and direction of magnetic field, configuration of filter media 150, etc.) to be manipulated such that a wide variety of substances can be filtered from the ferrofluids, and is therefore highly adaptable to various systems. When the filter media 150 becomes exhausted (e.g., fully loaded), the filtered substance can be removed from the filter device 110. For example, if the filter media 150 is loaded with alcohol, water can be flushed through the filter device 110 to unload the alcohol. In other embodiments, the filter media 150 can be flushed with other fluids to remove the loaded substance, or the loaded filter media 150 can be disposed and replaced with a new filter media. In various embodiments, the loaded substance can be harvested from the filter media 150.

The filter device 110 can also be used to harvest various substances, such as copper. For example, a copper-rich fluid can be collected in a reservoir, and iron can be added to the copper fluid to transform it into a ferrofluid that can be introduced into the filter device 110. As the iron-infused copper fluid flows through the filter device, the iron is affected by the applied magnetic field while the copper is not. This separates the iron from the copper, and allows the copper to exit the filter device 110 and be harvested in its pure state.

In various aspects of the present technology, the filter device 110 can also be used in conjunction with sensor systems. For example, the filter device 110 can selectively filter a substance from a fluid, measure the level of that substance with respect to the fluid, and indicate when the level of the substance is above a predetermined threshold. In one embodiment, the filter device 110 can be positioned proximate a fitting in a pipeline to sensor and/or predict when a leak occurs. For example, the filter device 110 can be used in conjunction with the sensor systems described in U.S. patent application Ser. No. 12/806,634, filed Aug. 16, 2010, now U.S. Pat. No. 8,441,361, and entitled "METHODS AND APPARATUSES FOR DETECTION OF PROPERTIES OF FLUID CONVEYANCE SYSTEMS", which is incorporated herein by reference in its entirety.

In various embodiments, one or both of the end portions 116 of the housing 112 can include fluid distribution channels (e.g., staggered spiral-shaped channels) that spread the fluid evenly across the magnetic plates 122 and through the cavity 128. This reduces overuse of the filter media 150 at the center portion of the cavity 128 and increases the surface area of the filter media 150 that participates in the filtration process. In some embodiments, the fluid distribution channels can also include a filter media to provide additional filtration to the system 100. For example, the distribution channels can be made from a spiraled filter media described in U.S. patent application Ser. No. 13/584,790 filed Aug. 13, 2012 and entitled "FLUID DISTRIBUTION FILTERS HAVING SPIRAL FILTER MEDIA AND ASSOCIATED SYSTEMS AND METHODS", which is incorporated by reference herein in its entirety. In other embodiments, the body portion 114 of the housing 112 can include the fluid distribution channels to distribute fluid across and enhance the flow through the cavity 128.

Figure 2:
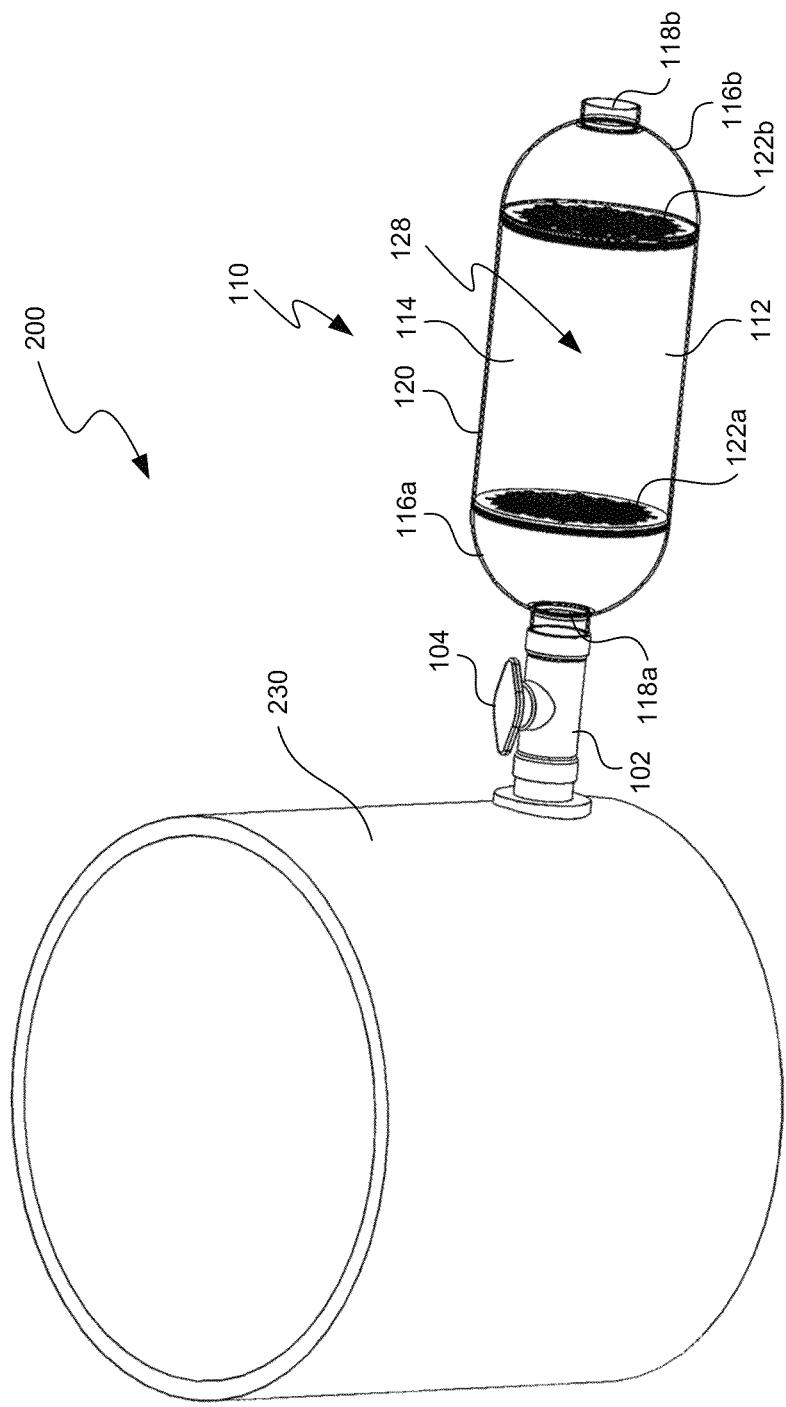
FIG. 2 is an isometric view of a dynamic filtration system having a reservoir configured in accordance with an embodiment of the present technology.

FIG. 2 is an isometric view of a dynamic filtration system ("system 200") configured in accordance with another embodiment of the present technology. Several features of the system 200 are generally similar to the features of the system 100 described above with reference to FIGS. 1A-1D. For example, the system 200 includes the filter device 110 that uses magnetic fields to filter ferrofluids and/or substances presented by actions of ferrofluids. Additionally, as shown in FIG. 2, the system 200 includes a reservoir 230 connected to the filter device 110 via the passageway 102. In various embodiments, the reservoir 230 can capture and store an unfiltered fluid until it is ready for filtration. When the unfiltered fluid is not inherently a ferrofluid, the reservoir 230 can be used as a basin to magnetically infuse the fluid. For example, the fluid in the reservoir 230 can be loaded with an architectural construct having various specializations such as an iron edge, or certain spacing between iron edges, or other characteristics. In other embodiments, the direction of flow through the filter device 110 may be reversed such that purified or filtered fluids are captured and stored in the reservoir 230 for later use.

Figure 3B:
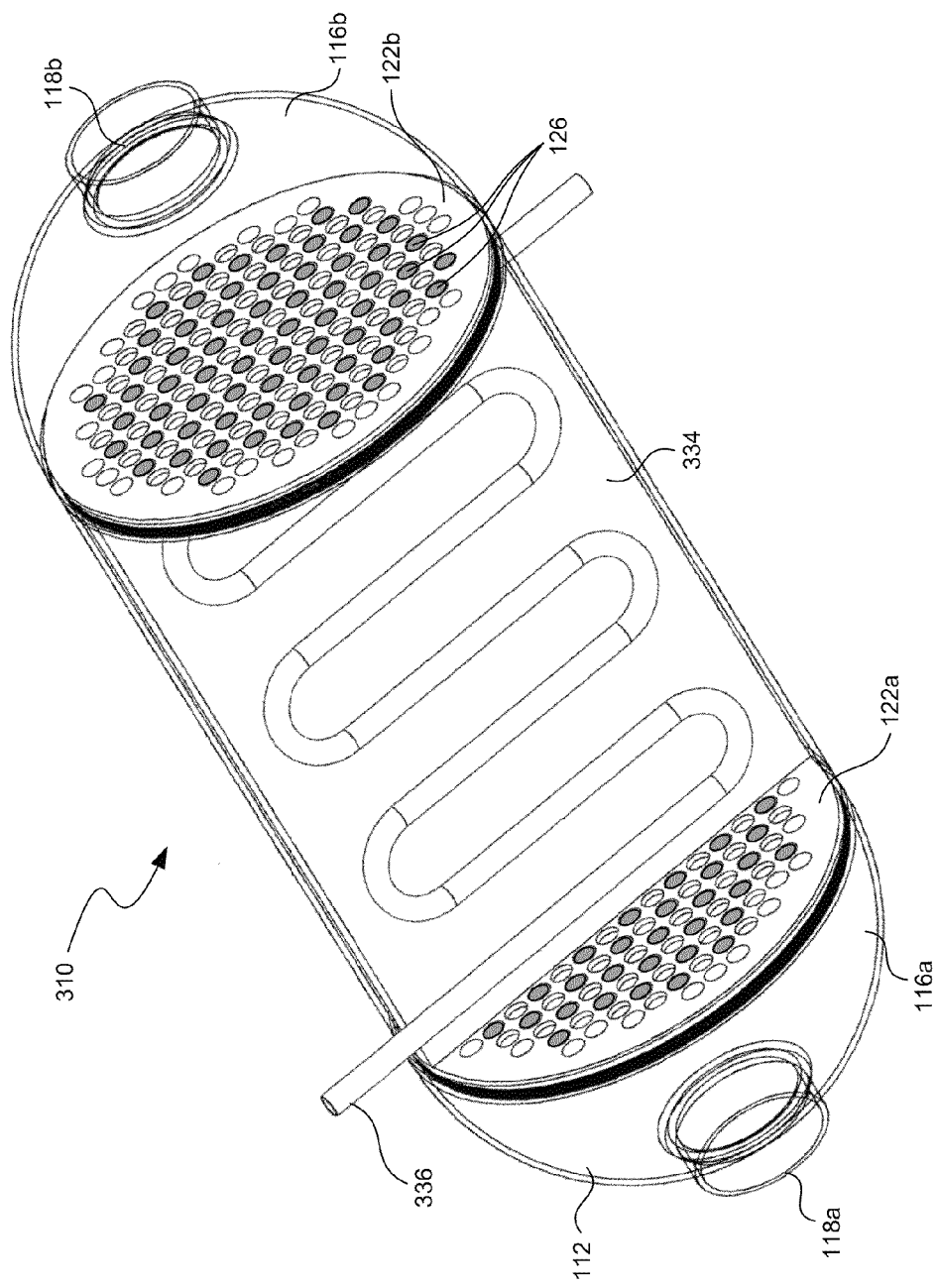

FIGS. 3A and 3B are partially transparent isometric views of a filter device 310 configured in accordance with another embodiment of the present technology. The filter device 310 includes features generally similar to the features of the filter device 110 described above with reference to FIGS. 1A-2. For example, the filter device 310 includes magnetic plates 122 positioned in the opposing end portions 116 of the housing 112 and the coil 120 around the housing 112. As shown in FIG. 3A, the filter device 310 further includes a heat exchanger 332 wrapped around and/or otherwise positioned on the housing 112 such that the heat exchanger 332 can transfer heat to or remove heat from the filter device 310. In various embodiments, the heat exchanger 332 may transfer heat to the filter device 310 to facilitate reactions during filtration. In other embodiments, the heat exchanger 332 can remove excess heat from exothermic processes that occur during filtration. For example, excess heat is typically produced during the filtration of sour gas (i.e., natural gas containing significant amounts of $H_2S$) when the sulfur reacts with iron (e.g., introduced via an architectural construct tailored with iron edge characteristics) to form iron sulfide. In other embodiments, the filter device 310 can include other heat transfer devices known in the art to transfer heat to and/or from the filter device 310.

Referring to FIG. 3B, the filter device 310 can further include a separator 334 that runs along the length of the body portion 114 of the housing 112 to form two filtration channels. The filtration channels can be configured to run in parallel, while removing different contaminants from the incoming fluid. For example, the two or more filtration channels shown in FIG. 3B can be loaded with different filter media and/or the magnets 126 in the magnetic plates 122 can be configured differently on either side of the separator 334 to remove different substances from the fluid. In other embodiments, the filter device 310 can include additional separators 334 to create more filtration channels and/or the separator(s) 334 can extend a greater length through the entire housing 112. The separator 334 can be made from a nonporous membrane, a polymer material, glass, and/or other suitable materials that form a barricade or divider for certain substances between filtration channels.

As further shown in FIG. 3B, in various embodiments, the filter device 310 can include another heat exchanger 336 positioned on the separator 334. This inner heat exchanger 336 may be particularly beneficial where the separator 334 allows for two separate filtration cycles and thus potentially two different reactions that require heat transfer. In other embodiments, different heat transfer mechanisms known in the art can be positioned within the housing 112 to add or remove heat from the filter device 310.

Figure 4A:
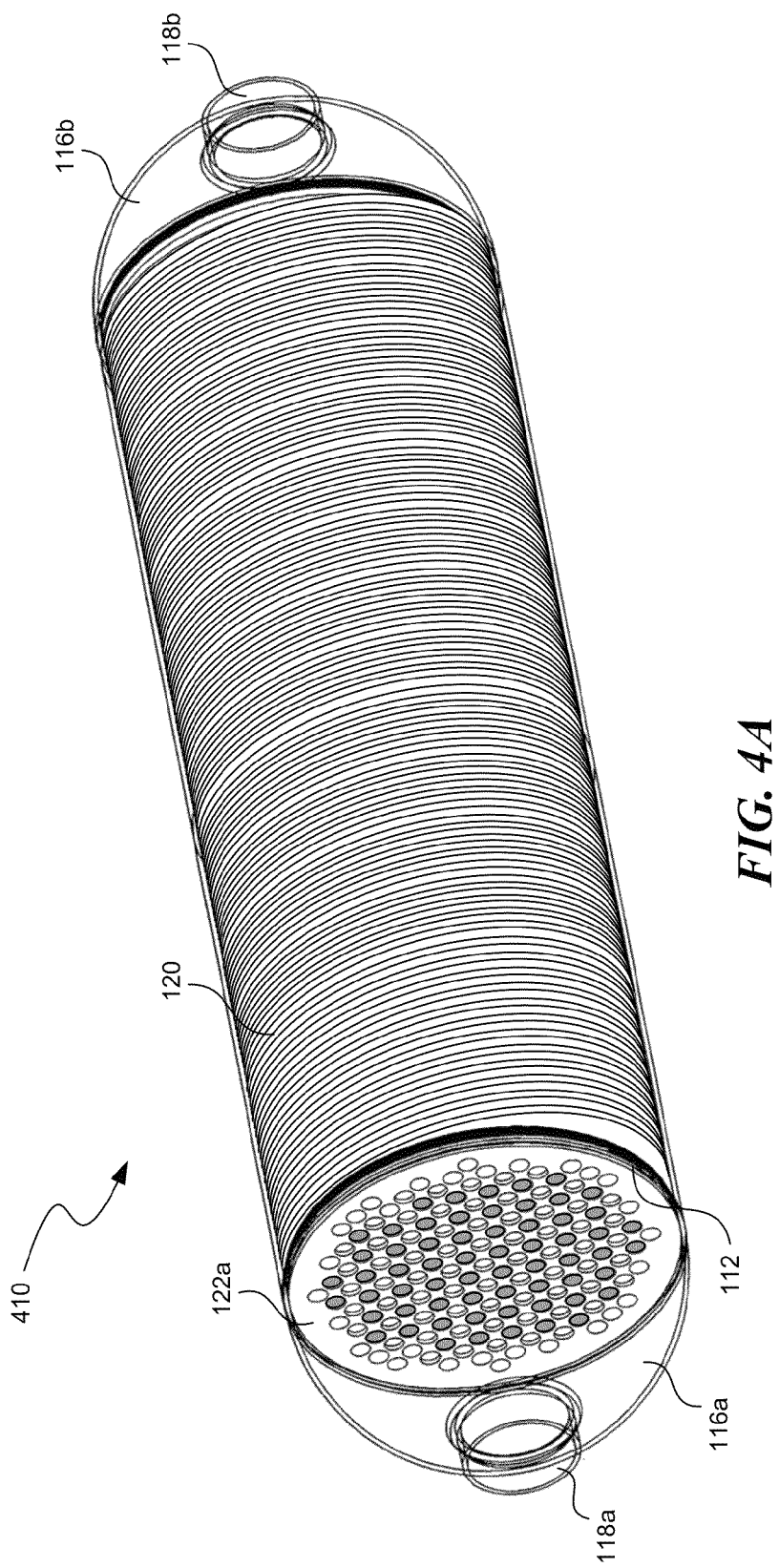
FIG. 4A is a partially transparent isometric view of a filter device configured in accordance with a further embodiment of the present technology.
Figure 4B:
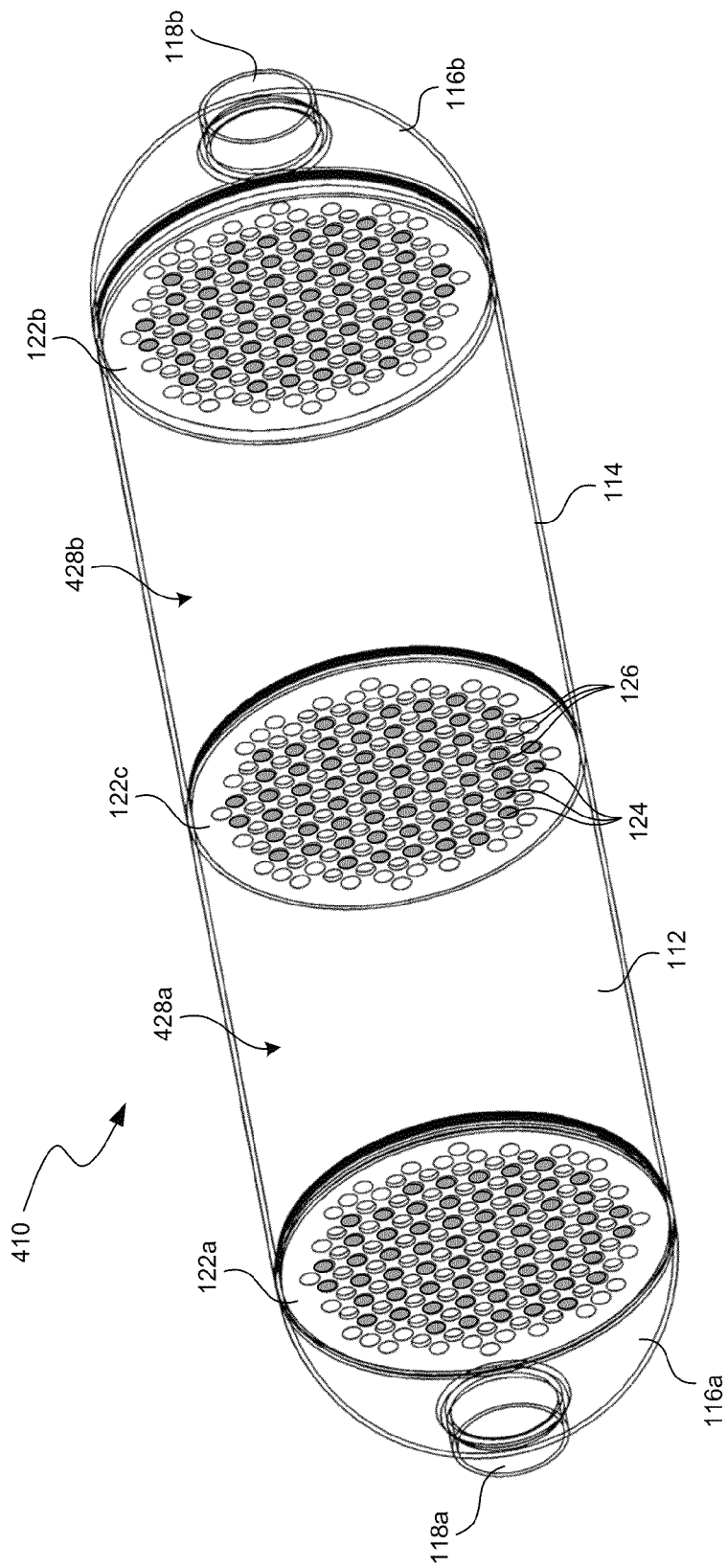
FIG. 4B is a partially transparent isometric view illustrating internal features of the filter device of FIG. 4A.

FIGS. 4A and 4B are partially transparent isometric views of a filter device 410 configured in accordance with a further embodiment of the present technology. The filter device 410 includes features generally similar to the features of the filter device 110 described above with reference to FIGS. 1A-1D. However, as shown in FIG. 4B, the filter device 410 includes a third magnetic plate 122c positioned transversely across the housing 112, thereby separating the body portion 114 into a first cavity 428a and a second cavity 428b. This configuration allows the first cavity 428a to be loaded with a different filter media than the second cavity 428b such that different substances are removed from the fluid as it flows through the different cavities 428. In selected embodiments, the third magnetic plate 122c can be configured to form different magnetic fields in the first and second cavities 428a and 428b, and thus alter their filtration properties (e.g., flow speed, characteristics of the ferrofluid, removal of substances from the fluid, etc.). In other embodiments, the filter device 410 can include additional magnetic plates 122 to form additional cavities 428, and can accordingly filter fluids in series through a plurality of filtration stages corresponding to each of the cavities 428.

Figure 5:
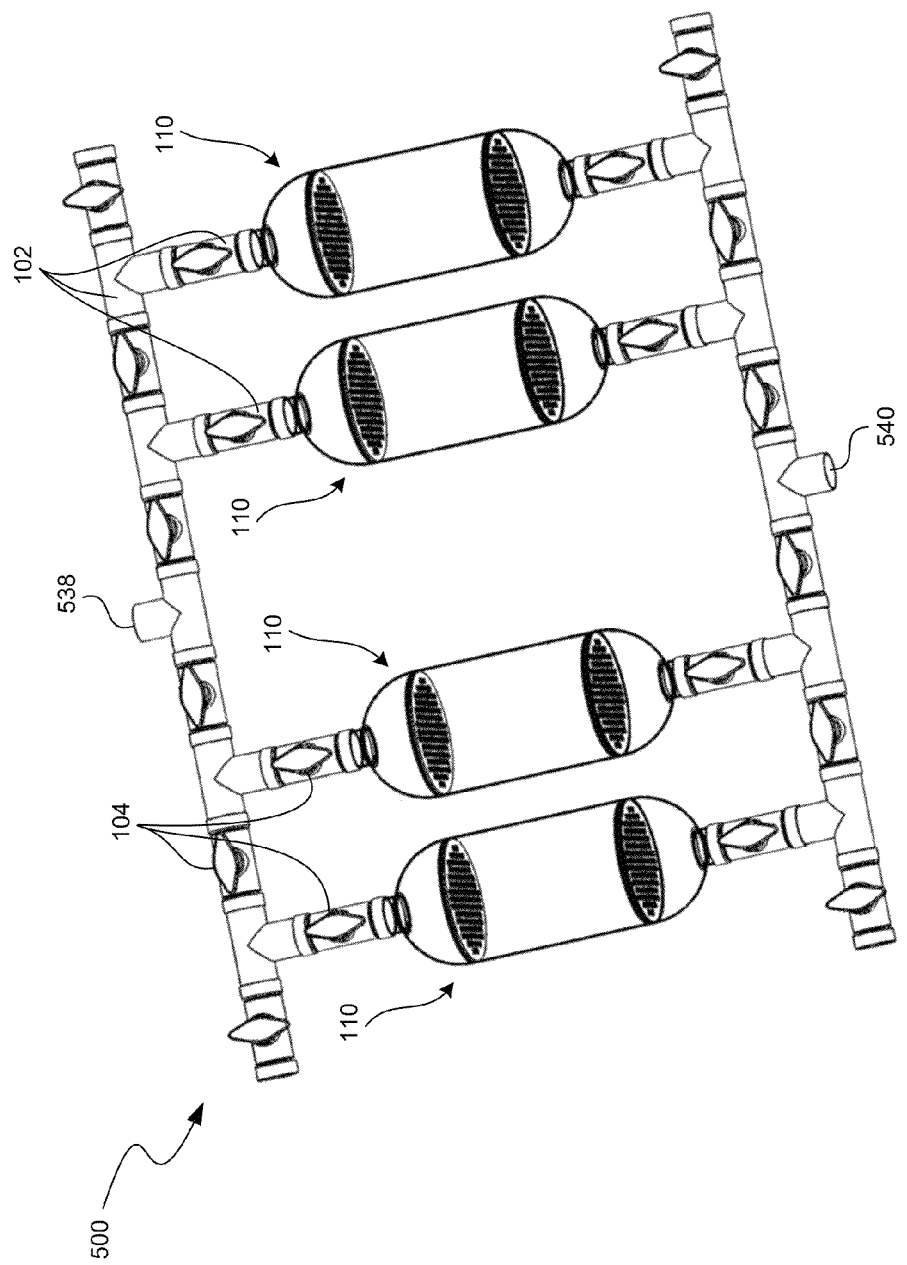
FIG. 5 is an isometric view of a dynamic filtration system having a plurality of filter devices arranged in parallel in accordance with an embodiment of the present technology.

FIG. 5 is an isometric view of a dynamic filtration system 500 ("system 500") including a plurality of filter devices 110 arranged in parallel with one another in accordance with an embodiment of the present technology. The system 500 can receive a fluid through an inlet 538, and the passageways 102 can deliver the fluid to the filter devices 110. In various embodiments, the valves 104 can be used to direct the fluid to selected fluid devices 110 in various series, parallel or series-parallel permutations. For example, during a filtration process, the filter devices 110 may be in various stages of loading and/or unloading a contaminant from the fluid. The system 500 can use the valves 104 to direct the fluid toward the filter devices 110 in the loading stage, while allowing the filter devices 110 in the unloading stage to remove the contaminant and recharge (e.g., load with a tailored architectural construct). After filtration, the fluid can exit the system 500 via an outlet 540 opposite the inlet 538.

In selected embodiments, the filter devices 110 can be configured to remove different contaminants from the fluid. For example, one of the filter devices 110 can be configured to remove sulfur and another filter device 110 can be configured to remove copper. The resultant purified fluid streams, therefore, each have different properties (e.g., a low sulfur fluid and a low copper fluid). The system 500 can therefore include a plurality of outlets to separately capture the different purified fluid streams.

Figure 6:
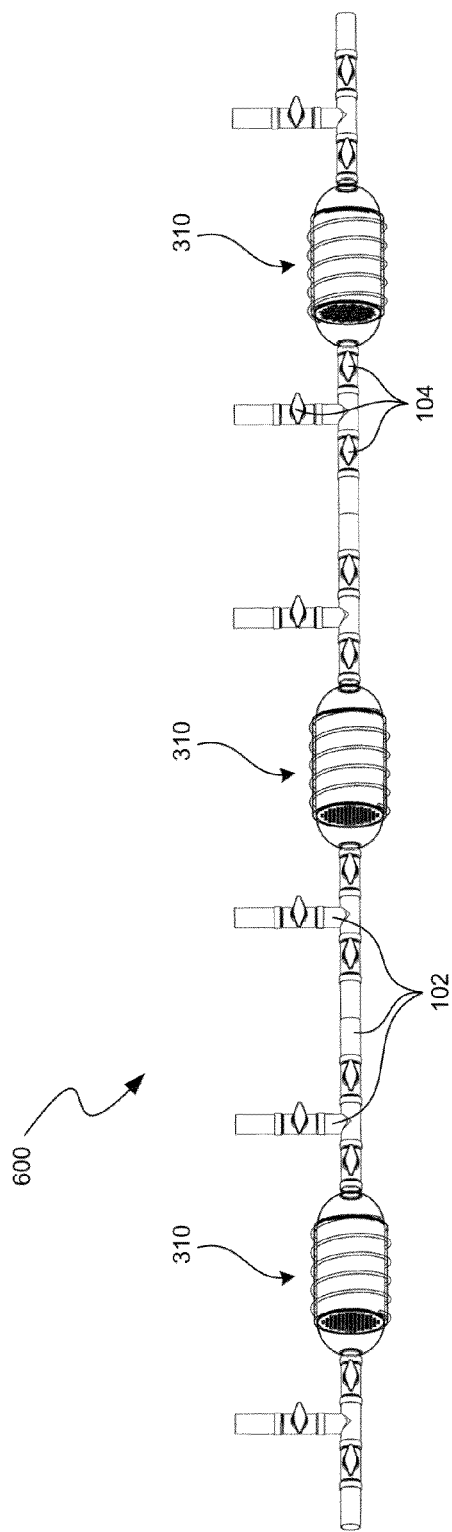
FIG. 6 is an isometric view of a dynamic filtration system including a plurality of filter devices arranged in series in accordance with an embodiment of the present technology.

FIG. 6 is an isometric view of a dynamic filtration system 600 ("system 600") configured in accordance with another embodiment of the present technology. The system 600 includes a plurality of the filter devices 310 described above with reference to FIGS. 3A and 3B. The filter devices are coupled together in series rather than in parallel (e.g., as shown in FIG. 5). In various embodiments, each filter device 310 can be configured to remove a different substance from a fluid such that the different substances are sequentially removed as the fluid passes through each filter device 310 and the fluid becomes increasingly purified as it moves through the serially coupled filter devices 310. In other embodiments, the filter devices 310 are configured to remove the same substance from the fluid. This increases the dwell time of the fluid in the filter devices 310, and therefore enhances filtration. As further shown in FIG. 6, the system 600 can also include inlet and outlet passageways 102 surrounding individual filter devices 310 to allow a fluid to be injected or removed from the system 600 at various points in the series.

Figure 7:
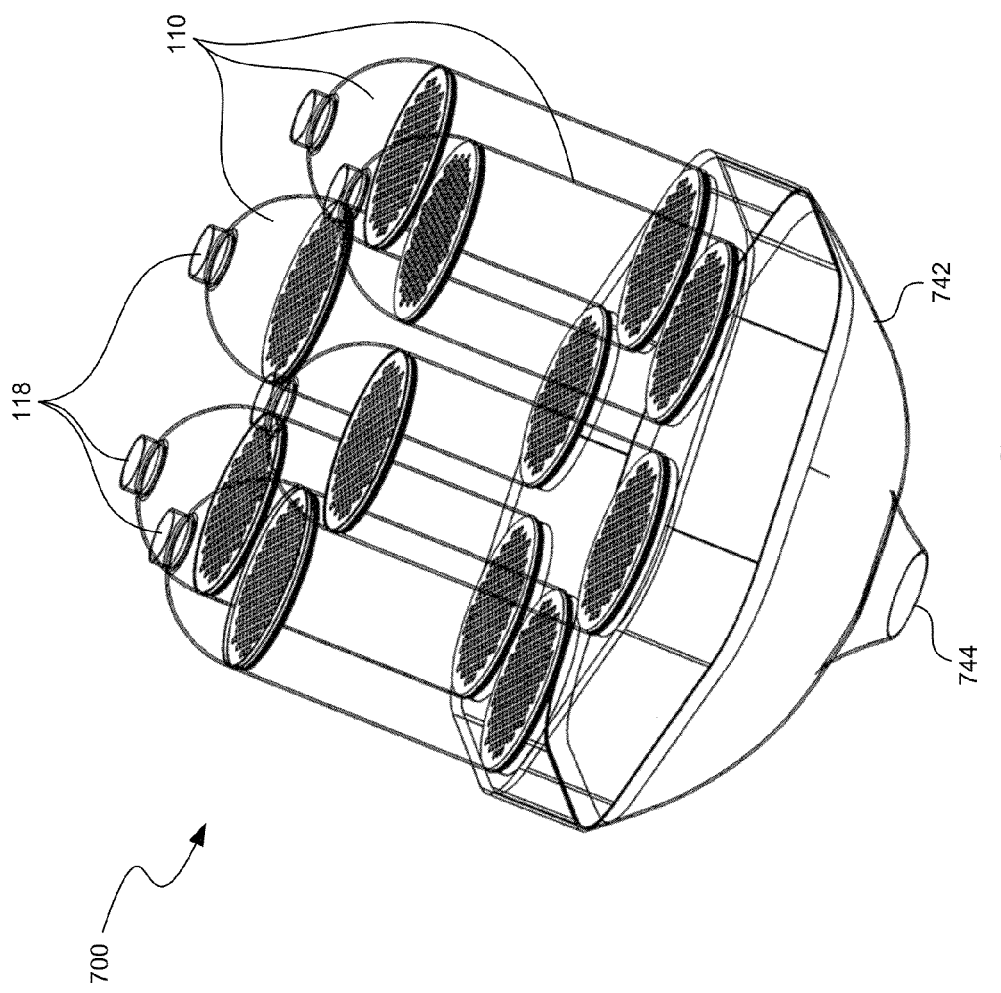
FIG. 7 is a partially transparent isometric view of a dynamic filtration system configured in accordance with yet another embodiment of the present technology.

FIG. 7 is a partially transparent isometric view of a dynamic filtration system 700 ("system 700") configured in accordance with a further embodiment of the present technology. As shown in FIG. 7, the system 700 can include a plurality of filter devices 110 positioned on a manifold 742. The manifold 742 can include an opening 744 that is in fluid communication with the openings 118 of the individual filter devices 110. The manifold 742 can therefore form a junction between the plurality of filter devices 110 to either deliver fluid to the separate filter devices 110 or funnel fluid from the filter devices 110 (depending the direction of fluid flow through the system 700). For example, in one embodiment, the opening 744 of the manifold 742 is configured as an inlet such that fluid flows into the manifold 742 and divides into the individual filter devices 110. The filter devices 110 can be configured to remove the same or different contaminants from the fluid. In various embodiments, the manifold 742 can further include fluid distribution channels that direct the fluid substantially evenly into the filter devices 110 and, optionally, pre-filter the fluid before it enters the filter devices 110 (e.g., as described in U.S. patent application Ser. No. 13/584,790 filed Aug. 13, 2012, and entitled "FLUID DISTRIBUTION FILTER HAVING SPIRAL FILTER MEDIA AND ASSOCIATED METHODS AND SYSTEMS," and incorporated by reference above). In other embodiments, the opening 744 of the manifold 742 is configured as an outlet that collects the filtered fluid from the filter devices 110.

From the foregoing, it will be appreciated that specific embodiments of the technology have been described herein for purposes of illustration, but that various modifications may be made without deviating from the disclosure. For example, the filter devices shown in the Figures are cylindrical with dome-shaped end portions. However, in other embodiments, the filter devices can have a variety of other shapes (e.g., cones, rectangular prisms, cubes, spheres etc.), aspect ratios, and must not necessarily be symmetrical about the end portions. Certain aspects of the new technology described in the context of particular embodiments may be combined or eliminated in other embodiments. For example, any one of the filter devices described above can be used in conjunction with any of the dynamic filtration systems. Additionally, the dynamic filtration systems shown in the Figures can be combined with one another to form an integrated filtration system. Moreover, while advantages associated with certain embodiments of the new technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

Features of the various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the disclosure can be modified, if necessary, to employ architectural constructs with various configurations, and concepts of the various patents, applications, and publications to provide yet further embodiments of the disclosure.

These and other changes can be made to the disclosure in light of the above-detailed description. In general, in the following claims, the terms used should not be construed to limit the disclosure to the specific embodiments disclosed in the specification and the claims, but should be construed to include all systems and methods that operate in accordance with the claims. Accordingly, the invention is not limited by the disclosure, but instead its scope is to be determined broadly by the following claims.

I claim:

1. A filter device, comprising:
a housing having a body portion between a first end portion and a second end portion, the first end portion having a first opening, the second end portion having a second opening, and the body portion defining a cavity between the openings;
an architectural construct in the cavity of the housing configured to filter a predetermined substance; and
a first and a second magnetic field element, wherein the first and second magnetic field elements interact to form a magnetic field across the body portion, and wherein the magnetic field is configured to drive and/or treat filtration of the predetermined substance.

2. The filter device of claim 1 wherein the cavity is preloaded with at least one of graphene, activated carbon, boron, spinel, and zeolite.

3. The filter device of claim 1 wherein the architectural construct is comprised of at least one of graphene, graphite, and boron nitride.

4. The filter device of claim 1 wherein the architectural construct is further configured to filter the predetermined substance by chemically binding with the predetermined substance.

5. The filter device of claim 1 wherein the architectural construct is further configured to be introduced into the filter device as the predetermined substance enters the filter device.

6. The filter device of claim 1 wherein the architectural construct is further configured as a substrate made from sorption media that comprises a plurality of parallel layers of a sorption material spaced apart from one another by a first distance.

7. The filter device of claim 6 wherein the architectural construct is further configured to filter the predetermined substance by loading molecules of the predetermined substance into zones between the plurality of parallel layers of the sorption material.

8. The filter device of claim 7 wherein the architectural construct is further configured to load the predetermined substance as heat is transferred away from the sorption media.

9. The filter device of claim 8 wherein the architectural construct is further configured to unload the predetermined substance from the zones between the plurality of parallel layers of the sorption material as heat is transferred to the sorption media.

10. The filter device of claim 7 wherein the architectural construct is further configured to load the predetermined substance as a voltage of a first polarity is applied to the sorption media.

11. The filter device of claim 10 wherein the architectural construct is further configured to unload the predetermined substance from the zones between the plurality of parallel layers of the sorption material as voltage of a second polarity opposite the first polarity is applied to the sorption media.

12. The filter device of claim 7 wherein the architectural construct is further configured to load the predetermined substance as pressure experienced by the sorption media is increased.

13. The filter device of claim 12 wherein the architectural construct is further configured to unload the predetermined substance from the zones between the plurality of parallel layers of the sorption material as pressure experienced by the sorption media is decreased.

14. The filter media of claim 7 wherein the sorption media includes surface structures and/or catalysts that facilitate loading of the predetermined substance into the zones between the parallel layers of the sorption material.

15. The filter device of claim 1 wherein the architectural construct is configured as a substrate made from sorption media that comprises a plurality of parallel layers of a sorption material spaced apart from one another by varying distances.

16. The filter device of claim 1 wherein the predetermined substance is a ferrofluid.

17. The filter device of claim 1 wherein
the predetermined substance is sulfur,
the architectural construct is preloaded with at least one of iron, iron carbide, and various compounds of halogens and iron, and
the architectural construct is loaded into the filter device before filtration.

18. The filter device of claim 1 wherein
the predetermined substance is sulfur,
the architectural construct is preloaded with at least one of iron, iron carbide, and various compounds of halogens and iron, and
the architectural construct is loaded into the filter device during filtration.

19. The filter device of claim 1 wherein the architectural construct is configured such that the predetermined substance can be harvested from the architectural construct.

20. The filter device of claim 1 wherein the first and second magnetic field elements are configured to change direction and/or frequency of application of the magnetic field such that the magnetic field supplies flow impetus or magnetic valving to the predetermined substance.

21. The filter device of claim 1 wherein the first and second magnetic field are configured to change the direction and/or frequency of application of the magnetic field such that the viscosity of the predetermined substance is altered.

* * * * *